(12) United States Patent
Du et al.

(10) Patent No.: US 11,196,032 B2
(45) Date of Patent: Dec. 7, 2021

(54) ELECTRODE SHEET ROLLING PRESS HAVING A SHORT STRESS LINE AND INTEGRATED APPARATUS FOR MANUFACTURING LITHIUM BATTERY ELECTRODE SHEET

(71) Applicant: TAIYUAN UNIVERSITY OF SCIENCE AND TECHNOLOGY, Shanxi (CN)

(72) Inventors: Xiaozhong Du, Shanxi (CN); Rongjun Wang, Shanxi (CN); Jinpeng Wang, Shanxi (CN); Yanjie Zhang, Shanxi (CN); Yang Tong, Shanxi (CN); Yiling Yue, Shanxi (CN); Jiamin Zhang, Shanxi (CN)

(73) Assignee: TAIYUAN UNIVERSITY OF SCIENCE AND TECHNOLOGY, Shanxi (CN)

( * ) Notice: Subject to any disclaimer, the term of this patent is extended or adjusted under 35 U.S.C. 154(b) by 190 days.

(21) Appl. No.: 16/621,423

(22) PCT Filed: Jun. 11, 2018

(86) PCT No.: PCT/CN2018/090570
§ 371 (c)(1),
(2) Date: Dec. 11, 2019

(87) PCT Pub. No.: WO2018/228304
PCT Pub. Date: Dec. 20, 2018

(65) Prior Publication Data
US 2020/0212421 A1  Jul. 2, 2020

(30) Foreign Application Priority Data

Jun. 12, 2017  (CN) .......................... 201710439580.8
Jun. 12, 2017  (CN) .......................... 201710439607.3

(51) Int. Cl.
*B05B 3/04* (2006.01)
*H01M 4/04* (2006.01)
(Continued)

(52) U.S. Cl.
CPC ........... *H01M 4/0435* (2013.01); *B05C 3/125* (2013.01); *B30B 3/04* (2013.01); *H01M 4/0404* (2013.01);
(Continued)

(58) Field of Classification Search
CPC .. H01M 4/0435; H01M 4/0404; H01M 4/139; B05C 3/125; B30B 3/04
See application file for complete search history.

(56) References Cited

U.S. PATENT DOCUMENTS 6,656,232 B1 * 12/2003  Usui .................... H01M 4/0409
29/623.1
10,403,878 B2    9/2019  Li et al.
(Continued)

FOREIGN PATENT DOCUMENTS

CN   200954692 Y   10/2007
CN   101877397 A   11/2010
(Continued)

OTHER PUBLICATIONS

International Search Report and Written Opinion from PCT Application No. CN2018090570 dated Aug. 8, 2018.
Chinese Search Report from CN Application No. 2017104395808.

*Primary Examiner* — Austin Murata
(74) *Attorney, Agent, or Firm* — Workman Nydegger (57) ABSTRACT

A short stress path-type electrode sheet rolling machine and an integrated machine equipment for manufacturing lithium battery electrode sheets, whereby the rolling machine comprises: an upper roller mechanism, a lower roller mechanism, an upper bearing base, a lower bearing base and a
(Continued)

roller-gap adjusting mechanism; the upper roller mechanism is connected to the upper bearing base, and the lower roller mechanism is connected to the lower bearing base; the upper bearing base and the lower bearing base are connected by means of a guide shaft; the roller-gap adjusting mechanism is connected to the upper roller mechanism so as to adjust a roller gap between the upper roller mechanism and the lower roller mechanism. The rolling machine has a simpler and more reliable structure, has a shorter stress return path when performing electrode sheet rolling, and may improve rolling precision and rolling quality.

14 Claims, 2 Drawing Sheets (51) Int. Cl.
*H01M 4/139* (2010.01)
*H01M 10/0525* (2010.01)
*B30B 3/04* (2006.01)
*B05C 3/12* (2006.01)

(52) U.S. Cl.
CPC ....... *H01M 4/139* (2013.01); *H01M 10/0525* (2013.01)

(56) References Cited

U.S. PATENT DOCUMENTS

| | | | | |
|---|---|---|---|---|
| 2005/0061047 | A1* | 3/2005 | Laliberte | H01M 4/13 72/147 |
| 2008/0098590 | A1* | 5/2008 | Tazoe | H01M 4/0435 29/623.5 |
| 2011/0033737 | A1* | 2/2011 | Miyahisa | H01M 50/60 429/94 |
| 2012/0246917 | A1* | 10/2012 | Dairen | H01M 4/0404 29/731 |
| 2013/0074711 | A1 | 3/2013 | Uematsu et al. | |

FOREIGN PATENT DOCUMENTS

| | | |
|---|---|---|
| CN | 201659237 U | 12/2010 |
| CN | 203410045 U | 1/2014 |
| CN | 204749345 U | 11/2015 |
| CN | 204809315 U | 11/2015 |
| CN | 105489846 A | 4/2016 |
| CN | 205550748 U | 9/2016 |
| CN | 107020764 A | 8/2017 |
| CN | 107104223 A | 8/2017 |
| CN | 206968025 U | 2/2018 |
| JP | 2013073690 A | 4/2013 |
| JP | 2013240822 A | 12/2013 |

\* cited by examiner

ELECTRODE SHEET ROLLING PRESS HAVING A SHORT STRESS LINE AND INTEGRATED APPARATUS FOR MANUFACTURING LITHIUM BATTERY ELECTRODE SHEET

CROSS-REFERENCE TO RELATED APPLICATIONS

This application claims priorities of Chinese patent application CN201710439580.8, entitled "an electrode sheet rolling press having a short stress line" and filed on Jun. 12, 2017, and Chinese patent application CN201710439607.3, entitled "an integrated apparatus for manufacturing lithium battery electrode sheet" and filed on Jun. 12, 2017, the entire contents of which are incorporated herein by reference.

TECHNICAL FIELD

The present invention relates to the field of lithium battery manufacturing equipment and related manufacturing process technology. In particular, the present invention relates to an electrode sheet rolling press having a short stress line and an integrated apparatus for manufacturing lithium battery electrode sheet.

TECHNICAL BACKGROUND

During the process of manufacturing lithium battery, slurry is coated on a current collector, such as copper foil, aluminum foil or the like, and then dried. Subsequently, the current collector should be compacted by a rolling press, so that active material can be bonded to the current collector with a uniform thickness in a solid and compact manner, thereby increasing the energy density of the battery. Current rolling presses for electrode sheet, such as the pressing roller device for lithium battery electrode sheet as disclosed by CN201520398943.4, are configured to comprise a frame, which includes a bottom plate, a top plate, and a plurality of intermediate pillars. Each intermediate pillar is fixed on the bottom plate with its bottom end, while fixed on the top plate with its top end. Two bottom support plates are fixed on the bottom plate, and two ends of the lower roller body are hinged on the bottom support plates. A driving motor, which has an output shaft connected to one end of the lower roller body through a coupling, is fixed on the bottom plate, and a gear box is fixed on an upper part of the top plate. A transmission shaft is hinged in the gear box, and a transmission bevel gear is fixed on each side of the transmission shaft. Two vertical rotating shafts are hinged on a top plate of the gear box, and the lower ends of the vertical rotating shafts are each fixed with a bevel gear, which engages with a corresponding one of the driving bevel gears. This kind of rolling press has the defects such as complicated structure, heavy weight, large footprint, and cumbersome operation. In addition, the current rolling presses have a relatively long stress line when the electrode sheet is pressed, so that the stress condition of the electrode sheet is not good, and the rolling precision is low.

SUMMARY OF THE INVENTION

In view of some or all of the above technical problems existing in the prior arts, the present invention, in one aspect, provides an electrode sheet rolling press having a short stress line. This rolling press has a simple and reliable structure, and the stress line formed when the electrode sheet is pressed is short, thus improving the rolling precision and the rolling quality.

In order to achieve the above object, the present invention provides an electrode sheet rolling press having a short stress line. The rolling press comprises an upper roller mechanism, a lower roller mechanism, an upper bearing seat, a lower bearing seat, and a roller gap adjusting mechanism. The upper roller mechanism and the lower roller mechanism are connected to the upper bearing seat and the lower bearing seat respectively, and the upper bearing seat and the lower bearing seat are connected with each other through a guiding shaft. The roller gap adjusting mechanism is connected to the upper roller mechanism for adjusting a nip between the upper roller mechanism and the lower roller mechanism.

In the present invention, since the upper and lower bearing seats and the guiding shaft are adopted, components, such as a frame or the like, which are heavy and also occupy a large amount of space, are no longer necessary, so that the overall structure is simpler. In addition, compared with current rolling presses, the present invention is structurally improved, so that the roller gap adjusting mechanism can directly adjust the nip between the upper roller mechanism and the lower roller mechanism through the upper bearing seat. In this manner, the rolling press of the present invention has an obviously short stress line when the electrode sheet is pressed, so that complicated transmission members, such as the transmission rod, the gear box or the like, can be reduced. This can not only provide more reliable operation, but also improve the rolling precision and the rolling quality.

In an embodiment, an elastic member for support is arranged between the upper bearing seat and the lower bearing seat. With the lower bearing seat being fixed, and the degree of compression of the elastic member by the upper bearing seat being adjusted by the roller gap adjusting mechanism, the nip between the upper roller mechanism connected to the upper bearing seat and the lower roller mechanism connected to the lower bearing seat can be adjusted.

In one embodiment, the roller gap adjusting mechanism includes an adjusting wheel, an adjusting shaft, an upper gap-adjusting plate, a guiding plate, and a lower gap-adjusting plate. The adjusting wheel is fixedly connected to the adjusting shaft, which is connected to the upper gap-adjusting plate through threads, and passes through the upper gap-adjusting plate and the guiding plate along a direction from top to bottom to connect with the lower gap-adjusting plate through threads. The lower gap-adjusting plate is fixedly connected to the upper bearing seat. That is, the degree of compression of the elastic member can be adjusted by the rotation of the adjusting wheel with simple and convenient operation.

In one embodiment, the roller gap adjusting mechanism further includes a sleeve disposed between the upper gap-adjusting plate and the guiding plate, and the guiding plate, which is in clearance fit with the adjusting shaft, has a lower end surface abutting against a shoulder of the guiding shaft. Here, the guide plate mainly functions for fixing and guiding, so that the overall structure is simple and reliable.

In one embodiment, a rotating direction of the adjusting shaft relative to the upper gap-adjusting plate is opposite to that of the adjusting shaft relative to the lower gap-adjusting plate, so that when the adjusting wheel is rotated, the adjusting shaft drives the lower gap-adjusting plate, the upper bearing seat and the upper roller mechanism to move up and down relative to the lower roller mechanism. Therefore, the nip can be effectively controlled by adjusting the thread engagement between the adjustment shaft and the upper and lower gap-adjusting plates respectively.

In one embodiment, the upper roller mechanism includes an upper roller body, an upper roller bearing, a first coupling, and a first servo motor. The first servo motor is connected to the upper roller body through the first coupling, and the upper roller body is connected to the upper bearing seat through the upper roller bearing.

In one embodiment, the lower roller mechanism includes a lower roller body, a lower roller bearing, a second coupling, and a second servo motor. The second servo motor is connected to the lower roller body through the second coupling, and the lower roller body is connected to the lower bearing seat through the lower roller bearing.

The rotation speeds of the upper and lower roller bodies can be controlled by the servo motors. The rolling speed can be effectively controlled by the cooperation of the servo motors connecting the upper and lower roller bodies. Further, the force exerted on the lithium battery electrode sheet when the electrode sheet is pressed can be improved, and the rolling precision and the roll quality can be both increased.

In one embodiment, the adjusting wheel is configured so that when it rotates to drive the lower gap-adjusting plate to move downwardly, the upper bearing seat compresses the elastic member such that a nip between the upper roller body and the lower roller body becomes smaller.

In an embodiment, the adjusting wheel is configured so that when it rotates to drive the lower gap-adjusting plate to move upwardly, the upper bearing seat moves upwardly along with the upper gap-adjusting plate such that the nip between the upper roller body and the lower roller body becomes larger.

In an embodiment, at least two lower bearing seats are provided and a bottom plate is arranged under the lower bearing seats. Said at least two lower bearing seats are fixed on the bottom plate, and connected to the upper bearing seat and the roller gap adjusting mechanism through four guiding shafts, each guiding shaft being fixedly connected to the bottom plate. The support for the upper roller mechanism and the lower roller mechanism is achieved by the pair of upper and lower bearing seats and four guiding shafts. The bottom plate functions to stabilize the bottom of the lower bearing seat, so that the rolling press of the present invention is not only light in weight, but also less prone to overturn.

Compared with the prior arts, the electrode sheet rolling press having a short stress line according to the present invention has the following advantages. The rolling press of the invention has a simple, compact and reasonable structure, and the operation thereof is stable and reliable. The upper roller body and the lower roller body are driven by the servo motors, so that the rolling speed can be effectively controlled, and the nip between the upper and lower roller bodies can be adjusted as needed, thereby effectively improving the working efficiency and the rolling quality of the lithium battery electrode sheet. Moreover, due to the short stress line formed during rolling, the stress condition is good, the rigidity of the apparatus is large, and the rolling precision is high.

On the other hand, with the rapid development of new energy electric vehicles, power lithium-ion battery, as the key component of current new energy electric vehicles, suffers low performance and unstable service life due to variation of the manufacturing equipment and process for the battery. These defects have become technical bottleneck restricting the rapid development of new energy electric vehicles. Currently, lithium battery electrode sheet is manufactured through multiple steps of coating, drying, rolling, and the like, and each step and associated device will affect the final performance and service life of the lithium battery. However, the existing steps for manufacturing lithium battery electrode sheet are individually performed, such as through a coating device, a rolling device, etc. Therefore, it not only suffers problems of large area, low efficiency, and high cost, but also easily generates the problem of unstable quality of the lithium battery electrode sheet manufactured.

In view of the problem of unstable quality of production of a lithium battery electrode sheet, the present invention proposes an integrated apparatus for manufacturing lithium battery electrode sheet, which can integrate all steps for manufacturing lithium battery, and keep the quality of the lithium battery electrode sheet stable.

In order to achieve the above object, the present invention provides an integrated apparatus for manufacturing lithium battery electrode sheet, comprising a rail base, and the followings on the rail base: an unwinding device, which is located at one end of the rail base, for unwinding a current collector of the battery electrode sheet; a coating device, which is arranged after the unwinding device, for coating the unwound current collector of the battery electrode sheet with slurry; a drying device, which is arranged after the coating device, for drying the current collector of the battery electrode sheet coated with slurry; a rolling device, which is arranged after the drying device, for compacting the dried battery electrode sheet; and a winding device, which is arranged at the other end of the rail base and after the rolling device, for winding the compacted battery electrode sheet. The rolling device is the electrode sheet rolling press having a short stress line as described above.

In the present invention, the battery electrode sheet is unwound by the unwinding device, then the steps of coating, drying, rolling and the like are sequentially performed, and finally, the compacted battery electrode sheet is wound. Therefore, the steps of unwinding, coating, drying, rolling, winding and the like are all performed by one single apparatus. In this manner, not only the manufacturing steps are integrated, but also lithium battery electrode sheet manufactured by such an integrated apparatus has stable quality since the manufacturing parameters, such as time, pressure or the like, set by the apparatus are consistent with each other.

In an embodiment, a guiding mechanism or a conveying mechanism is provided between the unwinding device and the winding device. In one of possible examples, a guiding mechanism is arranged between the unwinding device and the winding device, so that continuous and automatic conveyance of the battery electrode sheet can be achieved by the pushing force of the unwinding device, the guiding function of the guiding mechanism, and the winding force of the winding device. In another possible example, a known feeding mechanism suitable for conveyance of lithium battery electrode sheet may be provided between the unwinding device and the winding device.

In a preferred embodiment, the guiding mechanism is a guide roller. In a further preferred embodiment, an unwinding guide roller and a coating guide roller are arranged between the unwinding device and the coating device, with a winding guide roller being provided between the rolling device and the winding device. In the present invention, the guide roller mainly functions to guide and/or change directions. In addition, the guide roller as provided also serves to support the current collector of the battery electrode sheet. It can be understood that the unwinding guide roller, the coating guide roller and the winding guide roller in the present invention can be provided one or more according to actual needs.

In one embodiment, the unwinding device and the winding device are each driven by a servo motor, and a tension between the unwinding device and the winding device generated during winding is adjusted by the servo motors. Since the parameters, such as the speed or the like, of the servo motors driving the unwinding device and the winding device can be adjusted and controlled as needed, the tension of the wound current collector of the battery electrode sheet can be adjusted by the cooperation of the servo motors driving the unwinding device and the winding device.

In another embodiment, the battery electrode sheet is conveyed among the unwinding device, the coating device, the drying device, the rolling device, and the winding device in a continuous manner, and the conveying speed of the battery electrode sheet is controlled by the unwinding speed and the winding speed together.

In practice, the coating device coats slurry along a longitudinal direction on one or both sides of the current collector of the electrode sheet in a uniform manner. When the current collector of the battery electrode sheet is guided by the coating guide roller to pass between two rollers of the coating device, the current collector of the battery electrode sheet can be coated on one side or both sides thereof, which not only greatly improves the coating efficiency, but also facilitates to coat the battery electrode sheet uniformly.

In a preferred embodiment, the drying device is an oven, which is provided in form of multiple sections. By means of the oven, the battery electrode sheet can be dried in a fully enclosed or semi-closed manner, thus ensuring the performance and drying effect of the battery electrode sheet.

In a preferred embodiment, the rolling device is the electrode sheet rolling press having a short stress line, which has compact structure, small size, and low cost.

In one form of implementation, the rail base is provided with a slide, on which the unwinding device, the coating device, the drying device, the rolling device, and the winding device are all disposed, so that the distances between these devices are adjustable. Therefore, the devices can be conveniently arranged.

Compared with the prior arts, the integrated apparatus of the present invention has the following advantages. According to the integrated apparatus of the present invention, the steps of unwinding, coating, drying, rolling, winding and the like are all performed by one single apparatus, thus achieving fully continuous production of the lithium battery electrode sheet. Therefore, the manufacturing efficiency is increased, the foot print of the apparatus is reduced, and the cost is further lowered. Moreover, key parameters in the manufacturing process can be controlled automatically and precisely, thus greatly stabilizing the quality of the lithium battery electrode sheet manufactured.

BRIEF DESCRIPTION OF THE DRAWINGS

In the following, preferred embodiments of the present invention will be described in detail with reference to the accompanying drawings, in which.

In the above drawings, the same components are indicated by the same reference numerals. The drawings are not drawn to scale.

DETAILED DESCRIPTION OF THE PREFERRED EMBODIMENTS

In order to enable the technical solution and advantages of the present invention more self-distinct, the embodiments of the present invention are further described in detail with reference to the accompanying drawings. Obviously, the illustrated embodiments are part of the present invention, instead of exhaustive examples thereof. And the embodiments and the features in the embodiments of the present invention can be exchanged and combined with each other as long as there is no conflict.

In one aspect, an embodiment of the present invention provides an electrode sheet rolling press having a short stress line, which is described below.

Figure 1:
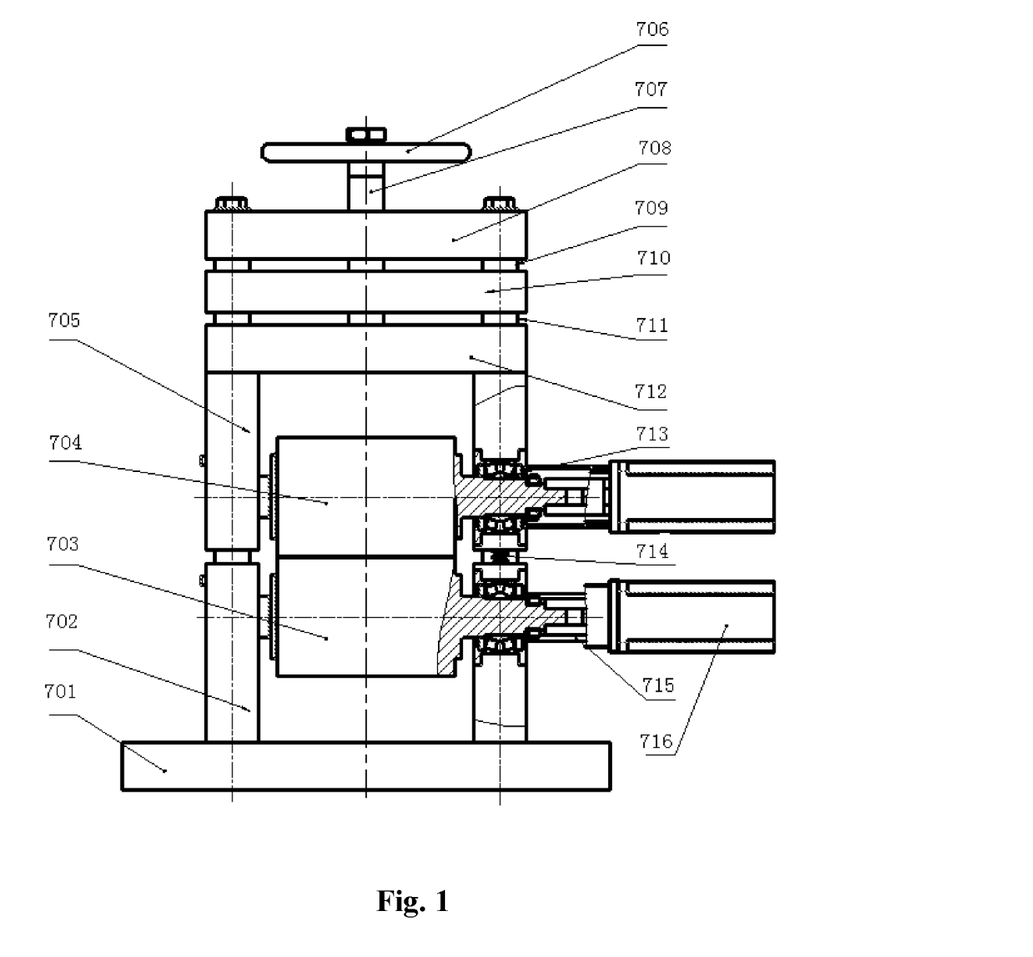
FIG. 1 is a schematic view showing the structure of an electrode sheet rolling press according to one embodiment of the present invention.

FIG. 1 shows an electrode sheet rolling press having a short stress line according to one embodiment of the present invention. In this embodiment, the electrode sheet rolling press having a short stress line according to the present invention mainly comprises an upper roller mechanism, a lower roller mechanism, an upper bearing seat 705, a lower bearing seat 702, a guiding shaft 711, and a roller gap adjusting mechanism. The upper roller mechanism is connected to the upper bearing seat 705, the lower roller mechanism is connected to the lower bearing seat 702, and the upper bearing seat 705 and the lower bearing seat 702 are connected with each other through the guiding shaft 711. The roller gap adjusting mechanism is connected to the upper roller mechanism, for adjusting a nip between the upper roller mechanism and the lower roller mechanism.

In one embodiment, in order to stabilize the lower bearing seat 702, a lower end (or a bottom) of the lower bearing seat 702 is connected to a bottom plate 701. In order to support the upper roller mechanism and the lower roller mechanism firmly, the lower bearing seat 702 and the upper bearing seat 705 are provided in pairs with equal numbers. For example, if two lower bearing seats 702 are used, there are correspondingly two upper bearing seats 705; and if four lower bearing seats 702 are used, there are correspondingly four upper bearing seats 705. Moreover, the lower end (or the bottom) of each lower bearing seat 702 is fixedly connected to the bottom plate 701.

In a preferred embodiment, the lower bearing seat 702 is connected to the upper bearing seat 705 via the guiding shaft 711. In a specific implementation, the bottom plate 701, the lower bearing seat 702, the upper bearing seat 705 and the roller gap adjusting mechanism are connected together by four guiding shafts 711.

In one embodiment, the electrode sheet rolling press having a short stress line according to the present invention mainly comprises the upper roller mechanism, the lower roller mechanism, the upper bearing seat 705, the lower bearing seat 702, the guiding shaft 711, an elastic member 714, and the roller gap adjusting mechanism. The upper roller mechanism is connected to the upper bearing seat 705, the lower roller mechanism is connected to the lower bearing seat 702, and the upper bearing seat 705 and the lower bearing seat 702 are connected with each other through the guiding shaft 711. The elastic member 714, as a supporting member, is arranged between the upper bearing seat 705 and the lower bearing seat 702. The roller gap adjusting mechanism is connected to the upper roller mechanism, so as to adjust the nip between the upper roller mechanism and the lower roller mechanism. Here, the lower bearing seat 702 is fixed, and the degree of compression of the elastic member 714 by the upper bearing seat 705 is adjusted by the roller gap adjusting mechanism, thereby adjusting the nip between the upper roller mechanism connected to the upper bearing seat 705 and the lower roller mechanism connected to the lower bearing seat 702. Preferably, the elastic member 714 can be a spring having required stiffness and compression amount.

In a preferred embodiment, the roller gap adjusting mechanism mainly includes an adjusting wheel 706, an adjusting shaft 707, an upper gap-adjusting plate 708, a guiding plate 710, and a lower gap-adjusting plate 712, which are disposed in this order along a direction from top to bottom. The adjusting wheel 706 is fixedly connected to the adjusting shaft 707, and fastened thereto by a nut. The adjusting shaft 707 is connected to the upper gap-adjusting plate 708 through threads. The adjusting shaft 707 passes through, along the direction from top to bottom, the upper gap-adjusting plate 708 and the guiding plate 710, and then is connected to the lower gap-adjusting plate 712 through threads. The lower gap-adjusting plate 712 is fixedly connected to the upper bearing seat 705. Since the lower gap-adjusting plate 712 is fixedly connected to the upper bearing seat 705, a force that is transferred to the lower gap-adjusting plate 712 when the adjusting wheel 706 is adjusted can be directly transferred to the upper bearing seat 705, and finally the nip can be adjusted through the degree of compression of the elastic member 714 by the upper bearing seat 705.

In one embodiment, the roller gap adjustment mechanism further includes a sleeve 709 disposed between the upper gap-adjusting plate 708 and the guiding plate 710. The sleeve 709 is arranged around the guiding shaft 711, and plays a supporting role between the guiding plate 710 and the upper gap-adjusting plate 708.

In a preferred embodiment, a lower end surface of the guiding plate 710 abuts against a shoulder of the guiding shaft 711. The guiding plate 710 is in clearance fit with the adjusting shaft 707. Here, the guiding plate 710 mainly functions for fixing and guiding. Further, the bottom plate 11, the lower bearing seat 702, the upper bearing seat 705, the lower gap-adjusting plate 712, the guiding plate 710, and the upper gap-adjusting plate 708 are connected together through the guiding shaft 711.

In one embodiment, the rotating direction of the adjusting shaft 707 relative to the upper gap-adjusting plate 708 is opposite to that of the adjusting shaft 707 relative to the lower gap-adjusting plate 712. For example, when the rotating direction of the adjusting shaft 707 relative to the upper gap-adjusting plate 708 is left-handed, the rotating direction of the thread between the adjusting shaft 707 and the lower gap-adjusting plate 712 is right-handed. In this manner, the upper bearing seat 705 and the lower bearing seat 702 can be brought close to each other or away from each other simultaneously during adjustment, thereby achieving adjustment of the nip between a lower roller body 703 and an upper roller body 704. Here, the guide plate 710 functions to guide the adjusting shaft 707. Therefore, when the adjusting wheel 706 is rotated, the adjusting shaft 707 drives the lower gap-adjusting plate 712, the upper bearing seat 705, and the upper roller mechanism to move up and down relative to the lower roller mechanism, thus changing the nip.

In one embodiment, the upper roller mechanism mainly includes the upper roller body 704, an upper roller bearing 713, a first coupling, and a first servo motor. The first servo motor is connected to the upper roller body 704 through the first coupling. Each end of the upper roller body 704 is connected to the upper bearing seat 705 through the upper roller bearing 713.

In one embodiment, the lower roller mechanism mainly includes the lower roller body 703, a lower roller bearing, a second coupling 715, and a second servo motor 716. The second servo motor 716 is connected to the lower roller body 703 through the second coupling 715. The lower roller body 703 is connected to the lower bearing seat 702 through the lower roller bearing. Here, the rotational speeds of the upper roller body 704 and the lower roller body 703 can be individually controlled by the first and second servo motors, and the rolling speed of the rolling press can be effectively controlled by cooperation of the servo motors connecting the upper and lower roller bodies. In this manner, the force exerted on the lithium battery electrode sheet when the electrode sheet is pressed can be improved, thus improving the rolling precision and the rolling quality. It can be understood that the first coupling may be the same as the second coupling, and the first servo motor may be the same as the second servo motor.

In one embodiment, when the adjusting wheel 706 is rotated to drive the lower gap-adjusting plate 712 to move downwardly, the upper bearing seat 705 compresses the elastic member 714 downwardly, such that the nip between the upper roller body 704 and the lower roller body 703 becomes smaller.

In one embodiment, the adjusting wheel 706 is rotated to drive the lower gap-adjusting plate 712 to move upwardly, the upper bearing seat 705 moves upwardly along with the upper gap-adjusting plate 708, such that the nip between the upper roller body 704 and the lower roller body 703 becomes larger.

That is to say, the nip can be effectively adjusted by an operation of rotating the adjusting wheel 706, which is simple and reliable. Moreover, with the change of the overall structure of the rolling press of the present invention, not only the rolling speed but also the nip can be effectively controlled, thereby improving the force exerted on the lithium battery electrode sheet when the electrode sheet is pressed, and further improving the rolling precision and the rolling quality.

On the other hand, an embodiment of the present invention proposes an integrated apparatus for manufacturing lithium battery electrode sheet, which will be described below.

Figure 2:
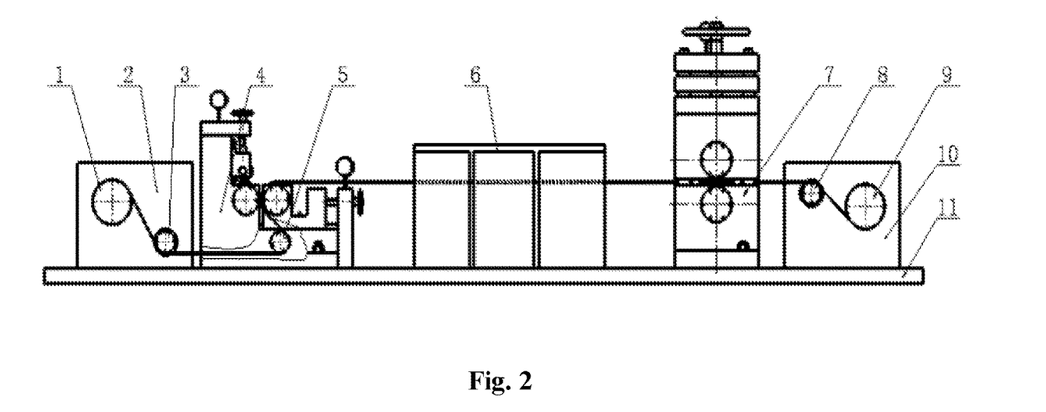
FIG. 2 is a schematic view showing the structure of an integrated apparatus for manufacturing lithium battery electrode sheet according to one embodiment of the present invention.

FIG. 2 shows a specific embodiment of the integrated apparatus for manufacturing lithium battery electrode sheet according to the present invention. In this embodiment, the integrated apparatus for manufacturing lithium battery electrode sheet according to the present invention mainly comprises a rail base 11, and an unwinding device 1, a coating device 4, a drying device 6, a rolling device 7, and a winding device 9 that are all arranged on the rail base 11.

The unwinding device 1 is located at one end of the rail base 11 (i.e., the left end in FIG. 2), and mainly functions to unwind current collector of the battery electrode sheet. The coating device 4, which is arranged after the unwinding device 1, mainly serves to coat the unwound current collector of the battery electrode sheet with slurry. The drying device 6 is arranged after the coating device 4, and mainly serves to dry the current collector of the battery electrode sheet coated with slurry. The rolling device 7 is arranged after the drying device 6, for compacting the dried battery electrode sheet. The winding device 9 is arranged at the other end of the rail base 11 (i.e., the right end in FIG. 2) and after the rolling device 7, for winding the compacted battery electrode sheet. The rolling device 7 can be the electrode sheet rolling press having a short stress line as described in the above embodiments.

In one embodiment, a guiding mechanism is provided between the unwinding device 1 and the winding device 9. The guiding mechanism between the unwinding device 1 and the winding device 9 can be, for example, a guiding roller, a guiding shaft, a guide bearing, or the like. Therefore, automatic and continuous conveyance of the battery electrode sheet can be achieved by the pushing force of the unwinding device, the guiding function of the guiding mechanism, and the winding force of the winding device.

In a preferred embodiment, the guiding mechanism is preferably a guiding roller. In the present invention, the guiding roll mainly functions to guide and/or change directions. In addition, the guiding roller can also support the current collector of the battery electrode sheet. At the same time, since the surface of the guide roller is smooth, it is not easy to scratch the current collector of the battery electrode sheet.

In a further preferred embodiment, an unwinding guide roller 3 and a coating guide roller 5 are arranged between the unwinding device 1 and the coating device 4. The unwinding guide roller 3 is attached to an unwinding support 2 of the unwinding device 1, and the coating guide roller 5 is attached to a holder of the coating device 4. It can be understood that in the present invention, there may be provided with one or more unwinding guide rollers 3 and coating guide rollers 5 according to actual needs.

In a further preferred embodiment, a winding guide roller 8 is provided between the rolling device 7 and the winding device 9. The winding guide roller 8 is connected to a winding holder 10 of the winding device 9. Similar to the unwinding guide roller 3 and the coating guide roller 5, there may be provided with one or more winding guide rollers 8 according to actual needs.

In another embodiment not shown, a conveying mechanism suitable for the conveyance of lithium battery electrode sheet can further be provided between the unwinding device 1 and the winding device 9. For example, the conveying mechanism may be a conveyor belt suitable for the conveyance of lithium battery electrode sheet, which is already known in the art, and therefore will not be described here in detail.

In one embodiment, the unwinding device 1 and the winding device 9 are each driven by a servo motor (not shown in FIG. 2). Since parameters such as the rotational speed of the servo motors that drive the unwinding device 1 and the drive winding device 9 can be adjusted and controlled as needed, the tension of the current collector of the wound battery electrode sheet can be adjusted through two servo motors that drive the unwinding device 1 and the drive winding device 9 respectively.

In another embodiment, the battery electrode sheet is conveyed among the unwinding device 1, the coating device 4, the drying device 6, the rolling device 7, and the winding device 9 in a continuous manner. The conveying speed of the battery electrode sheet is controlled by the unwinding speed and the winding speed together. Further, the conveying speed of the battery electrode sheet is controlled by the two servo motors that drive the unwinding device 1 and the winding device 9 respectively.

In one embodiment, the coating device 4 coats slurry along a longitudinal direction on one or both sides of the current collector of the battery electrode sheet in a uniform manner. As shown in FIG. 2, when the current collector of the battery electrode sheet is guided by the coating guide roller 5 to pass between two rollers of the coating device 4, it can be coated on one or both sides. Accordingly, not only the efficiency of coating is greatly improved, but also uniform coating of the battery electrode sheet is facilitated.

In one embodiment, the coating device 4 coats the slurry on one side of the battery electrode sheet. In this embodiment, generally only one coating device 4 is provided. Preferably, the coating device 4 is located above the battery electrode sheet, and under the battery electrode sheet there is provided with a rolling or rotating mechanism to push the current collector of the battery electrode sheet to move forward at a constant speed. It will be appreciated that the speed of the rolling or rotating mechanism should correspond to the rotational speed of the coating guide roller 5 and the coating speed of the coating device 4.

In another embodiment, the coating device 4 uniformly coats the slurry on the battery electrode sheet by coating both sides of the current collector of the battery electrode sheet. That is, one coating device 4 is provided at each side of the current collector of the battery electrode sheet. Preferably, one coating device 4 is disposed on the left side of the current collector of the battery electrode sheet while one coating device 4 is disposed on the right side thereof. When the current collector of the battery electrode sheet is guided by the coating guide roller 5 to pass between the two coating devices 4, double-sided coating of the current collector of the battery electrode sheet can be realized. In this manner, not only the coating efficiency is greatly improved, but also uniform coating on both sides of the battery electrode sheet is facilitated since the forces exerted on both sides are substantially the same in the longitudinal direction.

In a preferred embodiment, the drying device 6 may be an oven. The oven can be provided in form of multiple sections as needed. Through the oven, the battery electrode sheet can be dried in a fully enclosed or semi-closed manner, so as to ensure the performance and drying effect of the battery electrode sheet. Here, since it is necessary to ensure the battery electrode sheet is under a certain temperature in the drying procedure, temperature control can be easier to achieve in an oven, so as to ensure the performance and drying effect of the battery electrode sheet.

In one embodiment, the rolling device 7 is the electrode sheet rolling press having a short stress line as previously described. The electrode sheet rolling press having a short stress line has the advantages of compact structure, small size and low cost. With such advantages, the integrated apparatus for manufacturing lithium battery electrode sheet according to the present invention is advantageous in installation and can ensure the rolling precision.

In a preferred embodiment, the rail base 11 is provided with a slide, on which the unwinding device 1, the coating device 4, the drying device 6, the rolling device 7, and the winding device 9 are all disposed. In this manner, the distance between the unwinding device 1, the coating device 4, the drying device 6, the rolling device 7, and the winding devices 9 can be adjusted manually or electrically. The structure of the slide can facilitate the arrangement, installation and adjustment of these devices.

As described above, in the present invention the lithium battery electrode sheet is manufactured mainly by five devices, i.e., the unwinding device 1, the coating device 4, the drying device 6, the rolling device 7, and the winding device 9. The integrated apparatus for manufacturing lithium battery electrode sheet according to the present invention can combine individual steps for manufacturing the lithium battery electrode sheet, i.e., unwinding, coating, drying, rolling, and winding, into one. In addition, a fully automatic and continuous production of the lithium battery electrode sheet can be realized by fully automatic control. Compared with current manufacturing equipment and technology for lithium battery electrode sheet, the present invention can not only improve the production efficiency, but also easily ensure consistent quality of the lithium battery electrode sheet manufactured. In addition, the coating uniformity of the lithium battery electrode sheet is improved by means of double-sided or one-sided longitudinal coating on the current collector of the battery electrode sheet.

On the other hand, with the substantially identical inventive concept of the lithium battery electrode sheet manufacturing integrated device of the present invention, the present invention also proposes a process for manufacturing a lithium battery electrode sheet. The process mainly comprises the following steps.

In step A, the current collector of the battery electrode sheet is unwound through the unwinding device 1. In step B, the current collector of the battery electrode sheet is guided by the unwinding guide roller 3 to the coating device 4, where the current collector is uniformly coated with the slurry. In step C, the coated current collector of the battery electrode sheet is dried in the oven 6. In step D, the dried battery electrode sheet is compacted by the rolling device 7. In step E, the compacted battery electrode sheet is guided by the winding guide roller 8 to be wound by the winding device 9. Thus the lithium battery electrode sheet is completed.

According to the present invention, the coating, drying and rolling steps in the process for manufacturing the lithium battery electrode sheet are integrated, and by means of servo motors for controlling the speed and adjusting the tension, a continuous production of the lithium battery electrode sheet, including coating, drying and rolling, can be achieved.

While preferred embodiments of the invention have been described in the above, it will be apparent to those skilled in the art that various changes and modifications can be made to these embodiments on the basis of the basic inventive conception. Therefore, the appended claims are intended to be interpreted as including the preferred embodiments and modifications and/or modifications falling within the scope of the invention, and any modifications, equivalent substitutions, improvements, and the like within the spirit and principles of the present invention are intended to be included within the scope of the present invention.

The invention claimed is:

1. An electrode sheet rolling press having a short stress line, wherein the rolling press comprises an upper roller mechanism, a lower roller mechanism, an upper bearing seat, a lower bearing seat, a guiding shaft, and a roller gap adjusting mechanism,
wherein the upper roller mechanism and the lower roller mechanism are connected to the upper bearing seat and the lower bearing seat respectively, and the upper bearing seat and the lower bearing seat are connected with each other through the guiding shaft;
an elastic member for support is arranged between the upper bearing seat and the lower bearing seat;
the roller gap adjusting mechanism is connected to the upper bearing seat, and can adjust a force exerted on the elastic member via the upper bearing seat to move the upper bearing seat up or down as a whole, for adjusting a nip between the upper roller mechanism and the lower roller mechanism;
the roller gap adjusting mechanism includes an adjusting wheel, an adjusting shaft, an upper gap-adjusting plate, a guiding plate, and a lower gap-adjusting plate, wherein the adjusting wheel is fixedly connected to the adjusting shaft, which is connected to the upper gap-adjusting plate through threads, and passes through the upper gap-adjusting plate and the guiding plate along a direction from top to bottom to connect with the lower gap-adjusting plate through threads, and wherein the lower gap-adjusting plate is fixedly connected to the upper bearing seat;
the roller gap adjusting mechanism further includes a sleeve disposed between the upper gap-adjusting plate and the guiding plate, wherein the guiding plate, which is in clearance fit with the adjusting shaft, has a lower end surface abutting against a shoulder of the guiding shaft; and
a rotating direction of the adjusting shaft relative to the upper gap-adjusting plate is opposite to that of the adjusting shaft relative to the lower gap-adjusting plate, so that when the adjusting wheel is rotated, the adjusting shaft drives the lower gap-adjusting plate, the upper bearing seat and the upper roller mechanism to move up and down relative to the lower roller mechanism.

2. The rolling press according to claim 1, wherein the upper roller mechanism includes an upper roller body, an upper roller bearing, a first coupling, and a first servo motor,
wherein the first servo motor is connected to the upper roller body through the first coupling, and the upper roller body is connected to the upper bearing seat through the upper roller bearing.

3. The rolling press according to claim 2, wherein the lower roller mechanism includes a lower roller body, a lower roller bearing, a second coupling, and a second servo motor,
wherein the second servo motor is connected to the lower roller body through the second coupling, and the lower roller body is connected to the lower bearing seat through the lower roller bearing.

4. The rolling press according to claim 3, wherein the adjusting wheel is configured so that when it rotates to drive the lower gap-adjusting plate to move downwardly, the upper bearing seat compresses the elastic member such that a nip between the upper roller body and the lower roller body becomes smaller.

5. The rolling press according to claim 4, wherein the adjusting wheel is configured so that when it rotates to drive the lower gap-adjusting plate to move upwardly, the upper bearing seat moves upwardly along with the upper gap-adjusting plate such that the nip between the upper roller body and the lower roller body becomes larger.

6. The rolling press according to claim 1, wherein at least two lower bearing seats are provided, and a bottom plate is arranged under the lower bearing seats,
wherein said at least two lower bearing seats are fixed on the bottom plate and connected to the upper bearing seat and the roller gap adjusting mechanism through four guiding shafts, each guiding shaft being fixedly connected to the bottom plate.

7. An integrated apparatus for manufacturing lithium battery electrode sheet, comprising a rail base, wherein the apparatus further comprises, on the rail base:
an unwinding device, which is located at one end of the rail base, for unwinding a current collector of the battery electrode sheet;
a coating device, which is arranged after the unwinding device, for coating the unwound current collector of the battery electrode sheet with slurry;

a drying device, which is arranged after the coating device, for drying the current collector of the battery electrode sheet coated with slurry;

a rolling device, which is arranged after the drying device, for compacting the dried battery electrode sheet; and a winding device, which is arranged at the other end of the rail base and after the rolling device, for winding the compacted battery electrode sheet, wherein the rolling device is the rolling press according to claim 1.

8. The apparatus according to claim 7, wherein a guiding mechanism or a conveying mechanism is provided between the unwinding device and the winding device.

9. The apparatus according to claim 8, wherein the guiding mechanism is a guiding roller, and an unwinding guide roller and a coating guide roller are arranged between the unwinding device and the coating device, with a winding guide roller being provided between the rolling device and the winding device.

10. The apparatus according to claim 9, wherein the unwinding device and the winding device are each driven by a servo motor, and a tension between the unwinding device and the winding device generated during winding is adjusted by the servo motor.

11. The apparatus according to claim 7, wherein the battery electrode sheet is conveyed among the unwinding device, the coating device, the drying device, the rolling device, and the winding device in a continuous manner, and the conveying speed of the battery electrode sheet is controlled by the unwinding speed and the winding speed together.

12. The apparatus according to claim 11, wherein the coating device coats slurry along a longitudinal direction on one or both sides of the current collector of the electrode sheet in a uniform manner.

13. The apparatus according to claim 12, wherein the drying device is an oven, which is provided in form of multiple sections.

14. The apparatus according to claim 7, wherein the rail base is provided with a slide, on which the unwinding device, the coating device, the drying device, the rolling device, and the winding device are all disposed, so that the distances between these devices are adjustable.

* * * * *